US012043529B2

(12) United States Patent
Turnbull

(10) Patent No.: US 12,043,529 B2
(45) Date of Patent: Jul. 23, 2024

(54) TRUCK MOUNTED FORKLIFT

(71) Applicant: Cargotec Engineering Ireland Limited, Dundalk (IE)

(72) Inventor: Kevin Turnbull, Knockbridge (IE)

(73) Assignee: CARGOTEC ENGINEERING IRELAND LIMITED, Dundalk (IE)

( * ) Notice: Subject to any disclaimer, the term of this patent is extended or adjusted under 35 U.S.C. 154(b) by 533 days.

(21) Appl. No.: 17/238,638

(22) Filed: Apr. 23, 2021

(65) Prior Publication Data

US 2021/0331906 A1 Oct. 28, 2021

(30) Foreign Application Priority Data

Apr. 24, 2020 (GB) .................................... 2006034

(51) Int. Cl.
*B66F 9/075* (2006.01)

(52) U.S. Cl.
CPC ...... *B66F 9/07563* (2013.01); *B66F 9/07509* (2013.01); *B66F 9/07572* (2013.01)

(58) Field of Classification Search
CPC .............. B66F 9/07563; B66F 9/07509; B66F 9/07572; B66F 9/065; B66F 9/0655; B66F 9/06; B66F 9/00
(Continued)

(56) References Cited

U.S. PATENT DOCUMENTS 4,318,450 A 3/1982 Griesenbrock
4,826,474 A * 5/1989 Holmes ............... B66F 9/07563 414/718

(Continued)

FOREIGN PATENT DOCUMENTS

EP 1852966 A1 11/2007
EP 2357150 A1 8/2011

(Continued)

OTHER PUBLICATIONS

Ashwoods Electric motors, Interior Permanent Magnet Motors, available online at: <https://web.archive.org/web/20190914012019/http://ashwoodselectricmoto]>, retrieved on Feb. 22, 2023, 8 pages.

(Continued)

*Primary Examiner* — James A Shriver, II
*Assistant Examiner* — Hilary L Johns
(74) *Attorney, Agent, or Firm* — Brian J. Colandreo; Jeffery T. Placker; Holland & Knight LLP

(57) ABSTRACT

This invention relates to a truck mounted forklift (TMFL), more specifically an electrically powered TMFL. The TMFL comprises a U-shaped chassis having a pair of side bars bridged by a rear cross bar, a pair of front wheels, and a rear wheel. The TMFL further comprises a lifting assembly, a driver's station, and a battery pack mounted on the chassis. Each of the front wheels is provided with a dedicated electric wheel motor assembly. The electric wheel motor assemblies each comprise an interior permanent magnet (IPM) motor having a drive shaft, and a planetary gear box coupled to the IPM motor. The planetary gear box is mounted axially in-line with and is driven by the drive shaft. The IPM motor is mounted substantially internal the side bar and the planetary gear box is mounted substantially internal the bounds of the wheel rim. In this way, a very compact configuration of drive assembly for the front wheels is provided.

20 Claims, 13 Drawing Sheets

(58) Field of Classification Search
USPC .......................... 180/54.1; 414/477, 685, 697
See application file for complete search history.

(56) References Cited

U.S. PATENT DOCUMENTS

| | | | | |
|---|---|---|---|---|
| 2005/0190969 | A1* | 9/2005 | Cathier | G06T 7/187 382/199 |
| 2005/0220588 | A1* | 10/2005 | Turnbull | B66F 9/07563 414/467 |
| 2012/0130576 | A1 | 5/2012 | Sugiyama et al. | |
| 2013/0271087 | A1 | 10/2013 | McGrane et al. | |

FOREIGN PATENT DOCUMENTS

| | | | | |
|---|---|---|---|---|
| EP | 2653339 | A2 | 10/2013 | |
| FR | 2728884 | A1 | 7/1996 | |
| GB | 1092281 | A * | 5/1963 | B60F 9/10 |
| WO | 2006/090774 | A1 | 8/2006 | |
| WO | 2013/102484 | A1 | 7/2013 | |

OTHER PUBLICATIONS

Ashwoods, Electric Motors, IPM-200-33, E1A, Jun. 3, 2024, 2 pages.

Dana, Spicer (Registered) Electrified (Trademark), e-Hub Drive, E1, 2019 4 pages.

Oerlikon Fairfield, Fairfield Torque-Hub (Registered), Planetary Final Drives, E1C, Version 4, Apr. 2016, 8 pages.

Somalec manutention, Lesprit De Service, P1E, Mar. 9, 2015, 4 p. .

Tmm, Manitou extends its range of on-board frklifts with new mast models, the TMM, 4 Modeles, P1A, 2014, 1 page.

Wikipedia, Permanent magnet synchronous machine, available online at: <https://fr.wikipedia.org/wiki/Machine_synchrone_%C3%AO_aimants_permanents>, dated Aug. 3, 2023, 6 pages.

* cited by examiner

TRUCK MOUNTED FORKLIFT

RELATED APPLICATIONS

This Application is based on and claims the benefit of priority from United Kingdom Patent Application No. 2006034.9, filed 24 Apr. 2020, the entire disclosure of which is incorporated herein by reference.

TECHNICAL FIELD OF THE INVENTION

This invention relates to a truck mounted forklift (TMFL). More specifically, the invention relates to an electric truck mounted forklift.

BACKGROUND OF THE INVENTION

TMFLs are a very useful type of forklift truck that may be mounted on the rear of a trailer and transported to and from a customer's premises. Once there, the TMFL may be used to load and unload goods to or from the trailer. Accordingly, the TMFL obviates the need for the customer to have access to, or own, their own forklift.

These TMFLs are of necessity very lightweight as any increase in forklift weight reduces the carrying capacity of the carrying vehicle which would otherwise be used for the transport of goods on the carrying vehicle. Furthermore, any increase in weight of the forklift requires heavier tines and more robust mounting arrangements which in turn further increases the weight of the forklift and mounting arrangements and further reduces the carrying capacity of the carrying vehicle. For these reasons, it is also not possible for TMFLs to be provided with counterweights as would commonly be found in other types of forklifts.

In order to counteract the limitations brought on by the lack of counterweights, TMFLs are provided with a U-shaped chassis. In this way, loads can be picked up, put down and transported with the majority, if not all of the weight of the load located rearward of the front wheels. In this way, the TMFL will be able to lift significantly heavier loads than would otherwise be the case and will be more stable during transport of a load.

There are however a number of considerations and limitations particular to this TMFL configuration. First of all, it is desirable to keep the frame opening between the side bars as wide as possible so that the TMFL is able to pick up wider loads. If the frame opening between the side bars is reduced, this will reduce the physical size of heavy goods that may be picked up, thereby reducing the usefulness of the forklift. However, it is not possible to simply increase the frame opening between the side bars unchecked, as the total width of the forklift cannot protrude outwardly beyond the sides of the carrying vehicle during transit. The forklift width is therefore limited by the carrying vehicle's dimensions to a certain degree.

One could argue that it would be possible to increase the frame opening between the side bars without increasing the overall width of the TMFL by having non-driven front wheels. However, this is impractical as the majority of the weight of the TMFL would be located away from the driven rear wheel which would result in a TMFL that was difficult to manoeuvre and less effective in operation. Furthermore, three-wheel drive is necessary to navigate rough terrain and climb obstacles such as kerbs. It is therefore necessary to provide driven front wheels. However, this requires a motor to drive the front wheel. This problem becomes particularly acute in electric vehicles, as it is understood that the electric motor and associated gearing to drive the front wheel will take up significant space in the side bar, reducing the frame opening between the side bars.

As the dimensions of the side bar increase to accommodate the electric motor and gearing, not only does this increase the weight and the cost of the side bar, but this can also lead to a reduction of the TMFL's ground clearance, i.e. the distance between the underside of the side bar and the ground. A reduction in ground clearance will negatively impact the TMFL's ability to mount obstacles such as kerbs and the like.

In addition to the foregoing, there are a number of other design limitations particular to TMFLs that should be taken into consideration. For example, the amount by which the TMFL protrudes from the rear of a carrying vehicle during transit, often referred to as overhang, is regulated by law in many countries. Therefore, increases in the dimensions of the rear wheel assembly are also disadvantageous. Furthermore, the greater the overhang, the greater the forces applied by the TMFL on the tines and mounting equipment. This necessitates more robust, heavier tines and mounting equipment which is undesirable for the reasons outlined above.

GB Patent Application Publication No. GB1,092,281, in the name of Ransomes Sims & Jeffries Limited, discloses a forklift reach truck with front wheels having reduction gearing housed within a tubular stub axle.

It is an object of the present invention to provide an electrically powered TMFL that overcomes at least one of these problems. It is a further object of the invention to provide a useful alternative choice to the consumer.

SUMMARY OF THE INVENTION

According to the invention there is provided a truck mounted forklift (TMFL) comprising a U-shaped chassis having a pair of forwardly projecting side bars bridged by a rear cross bar, a pair of front wheels, one at the forwardmost end of each of the side bars, and a rear wheel located substantially centrally on the rear cross bar, a lifting assembly mounted on the U-shaped chassis comprising a fork carriage and a pair of forks mounted on the fork carriage, the lifting assembly being configured to provide adjustment to the height and the reach of the forks, a driver's station mounted on the chassis and a battery pack mounted on the chassis, and in which each of the front wheels is provided with a dedicated electric wheel motor assembly, each of the electric wheel motor assemblies comprising an interior permanent magnet (IPM) motor having a drive shaft, a planetary gear box coupled to the IPM motor, the planetary gear box being mounted axially in-line with and driven by the drive shaft, in which the IPM motor is mounted substantially internal the side bar and the planetary gear box is mounted substantially internal the bounds of the wheel rim.

By having such a TMFL, the electric wheel motor assembly to drive the front wheels will be very compact and will not substantially increase the maximum width of the forklift or substantially reduce the frame opening between the side bars. This is highly advantageous as the forklift will be able to pick up and put down wider heavy loads rearward of the front wheels than would otherwise be the case. At the same time, the TMFL will not protrude outwardly beyond the sides of the carrying vehicle during transit.

In addition, the construction is efficient in operation with efficient power transfer from the motor to the wheels via the gear box. This will reduce the power requirement and increase battery life.

In one embodiment of the invention there is provided a truck mounted forklift in which the gear box is encased in a hub casing, the hub casing having a plurality of coupling members for engagement of a wheel. This is seen as a useful way of coupling the electric wheel motor assembly to the wheel of the TMFL. The gear box effectively becomes a component of the wheel, utilizing the space in the wheel to good effect.

In one embodiment of the invention there is provided a truck mounted forklift in which the coupling members comprise a plurality of bolts circumferentially spaced around the hub casing.

In one embodiment of the invention there is provided a truck mounted forklift in which there is provided a mounting plate for securing the electric wheel motor assembly to the side bar. Preferably, the mounting plate will be positioned intermediate the IPM motor and the planetary gear box. The mounting plate will enable the electric wheel motor assembly to be securely fastened in position to the side bar. The other components may be serviced or removed without the need to remove all of the components from the TMFL, thereby simplifying and speeding up repair and servicing.

In one embodiment of the invention there is provided a truck mounted forklift in which the motor of the electric wheel motor assembly is a 10 kW motor.

In one embodiment of the invention there is provided a truck mounted forklift in which the rear wheel is provided with a dedicated electric rear wheel motor assembly, the electric rear wheel motor assembly comprising an interior permanent magnet (IPM) motor having a drive shaft, a planetary gear box coupled to the IPM motor, the planetary gear box being mounted axially in-line with and driven by the drive shaft, in which the planetary gear box is mounted substantially internal the bounds of the wheel rim of the rear wheel. This is seen as a useful implementation of the invention. By having such a configuration, the rear wheel will also be compact which is useful for both weight distribution, handling and also for reducing the overhang of the TMFL, (i.e. the amount by which the TMFL protrudes rearwardly from the carrying vehicle) another serious consideration in TMFL construction.

In one embodiment of the invention there is provided a truck mounted forklift in which electric rear wheel motor assembly comprises a brake assembly intermediate the IPM motor and the planetary gear box. This is seen as a particularly useful aspect of the present invention. In this way, it is possible to incorporate a safety brake into the rear wheel that will prevent inadvertent movement of the forklift when the TMFL is turned off or parked on a hill. The construction is also advantageously compact and although it will tend to add some length to the electric rear wheel motor assembly, it is advantageous to mount it on the rear wheel as this will avoid narrowing of the distance between the side bars and will provide an effective braking mechanism.

In one embodiment of the invention there is provided a truck mounted forklift in which the brake assembly is a spring-applied electro-magnetic brake disc that has a default locked configuration and is transitioned from a locked configuration to a release configuration by application of an electrical current. This is seen as a particularly useful configuration as it will be automatically applied once the electric forklift is turned off and can be disengaged on the forklift being turned on again. This is a useful safety feature of the TMFL.

In one embodiment of the invention there is provided a truck mounted forklift in which the spring force of the spring-applied electro-magnetic brake disc is greater than or equal to 60 Nm.

In one embodiment of the invention there is provided a truck mounted forklift in which the motor of the electric rear wheel motor assembly is a 20 kW motor.

In one embodiment of the invention there is provided a truck mounted forklift in which the planetary gear box is of the order of a 47:1 planetary gear box operable to reduce the speed and increase the torque output of the motor. Preferably, the gearing ratio is the same for all the wheels.

In one embodiment of the invention there is provided a truck mounted forklift in which the battery pack mounted on the chassis drives each of the IPM motors.

BRIEF DESCRIPTION OF THE DRAWINGS

The invention will now be more clearly understood from the following description of some embodiments thereof given by way of example only with reference to the accompanying drawings, in which:—

DETAILED DESCRIPTION OF THE INVENTION

Figure 2:
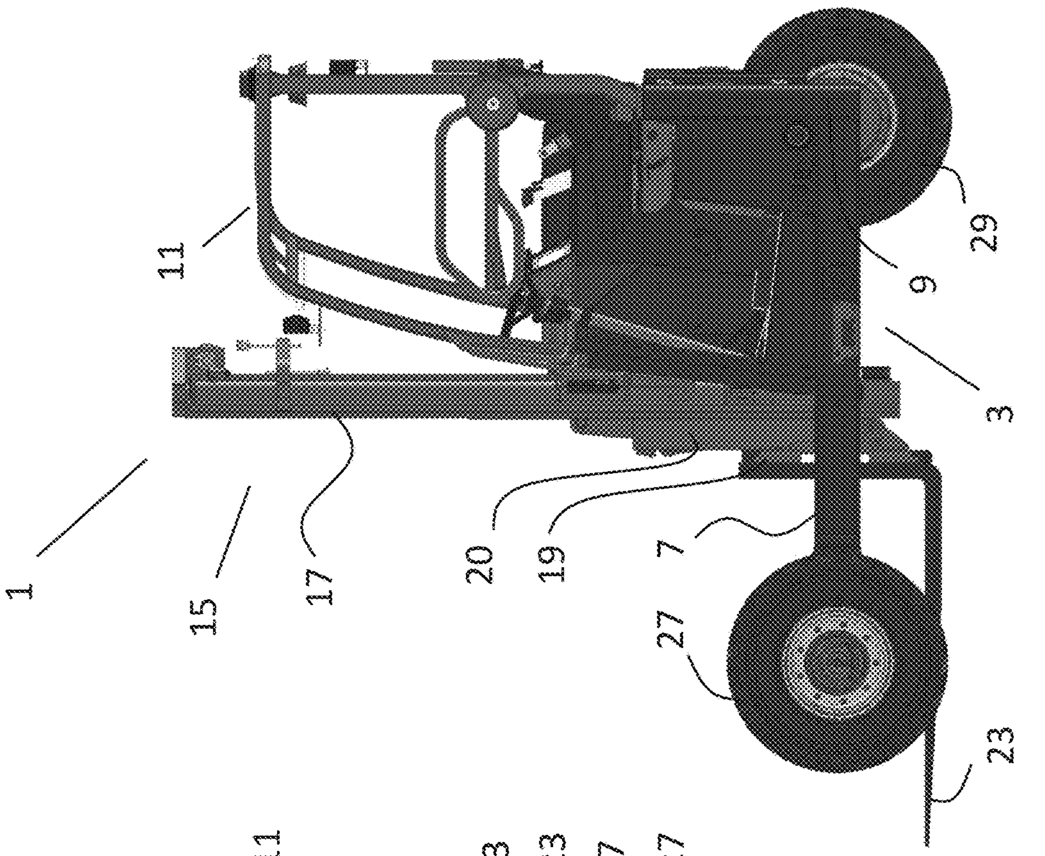
FIG. 2 is a side view of a truck mounted forklift according to the invention.
Figure 1:
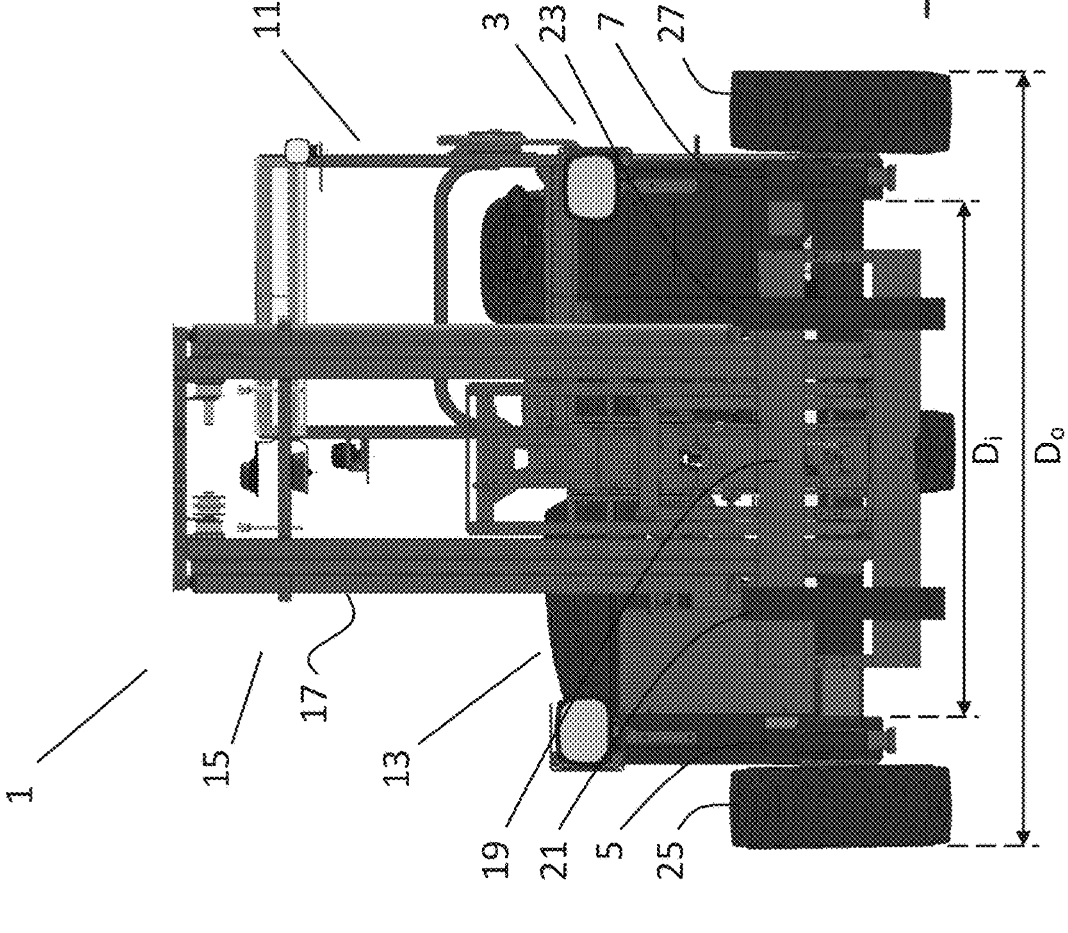
FIG. 1 is a front view of a truck mounted forklift according to the invention.
Figure 3:
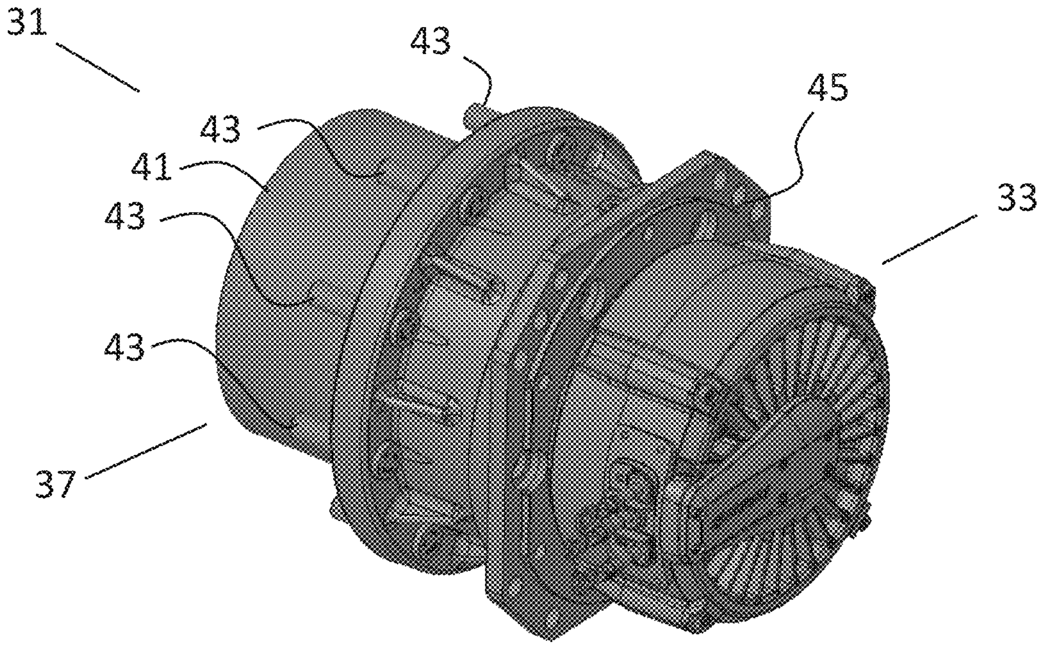
FIG. 3 is a perspective view of an electric wheel motor assembly.
Figure 4:
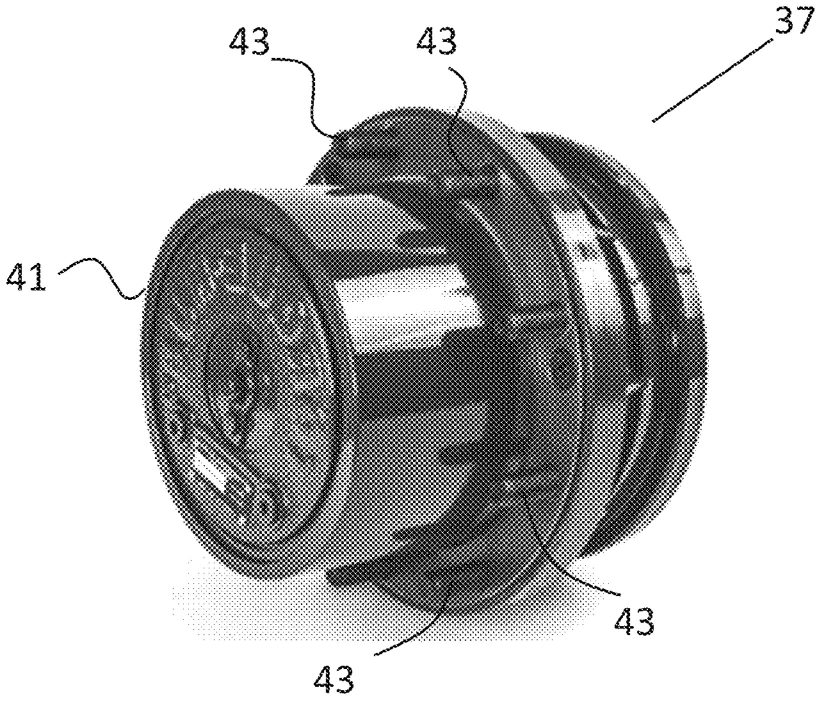
FIG. 4 is a rear perspective view of a gearbox of the electric wheel motor assembly of FIG. 3.
Figure 5:
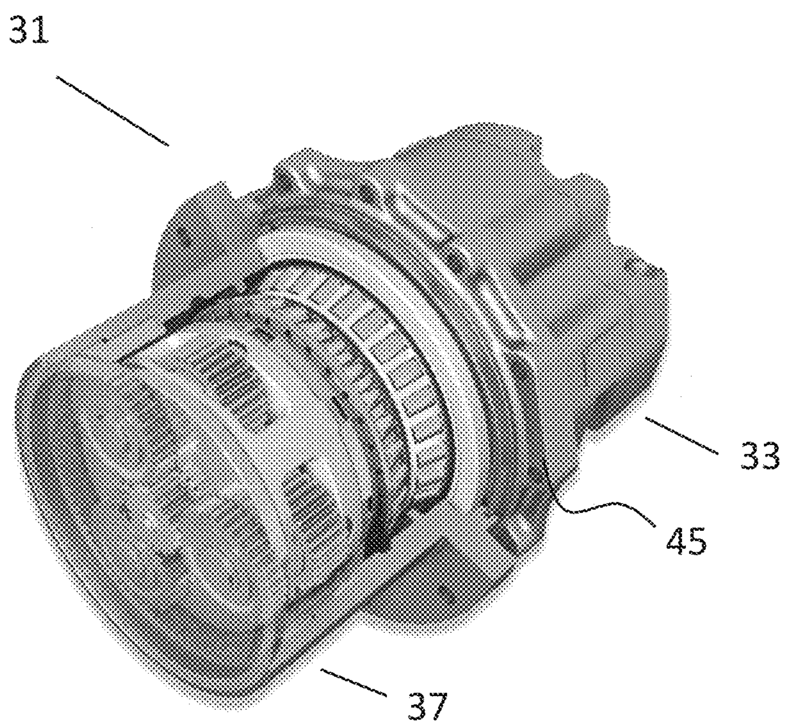
FIG. 5 is a perspective view of the gearbox of the electric wheel motor assembly with parts thereof shown in ghost outline to illustrate internal detail, connected to an alternative motor.
Figure 6:
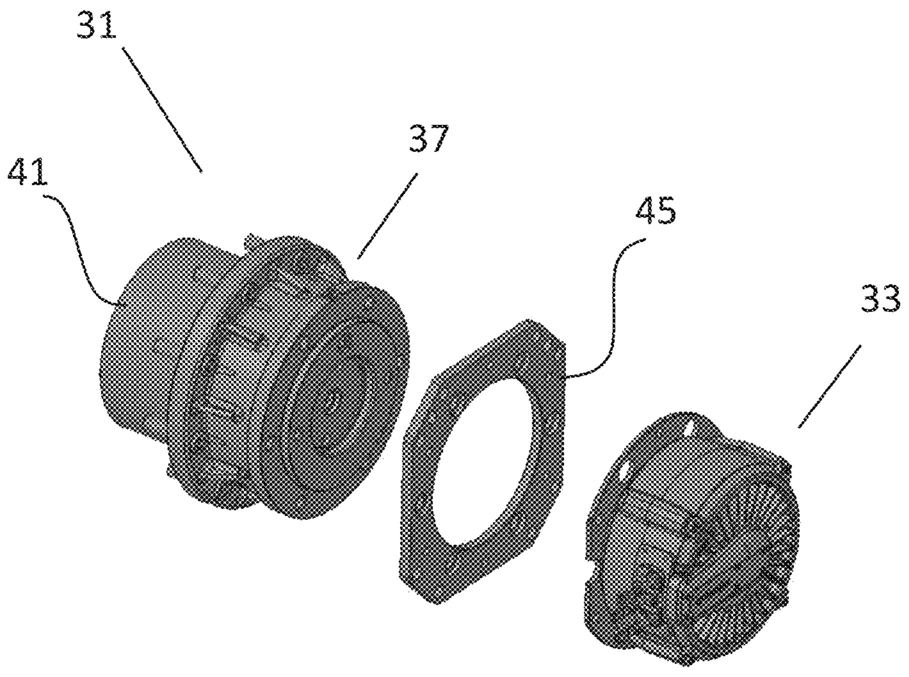
FIG. 6 is an exploded view of the electric wheel motor assembly.

Referring to FIGS. 1 and 2, there is shown a truck mounted forklift (TMFL), indicated generally by the reference numeral 1, comprising a U-shaped chassis 3 having a pair of side bars 5, 7 and a rear cross bar 9 bridging the two side bars. A driver's station 11, a battery pack 13, and a lifting assembly 15 are mounted on the chassis. The lifting assembly comprises an upright mast 17 having a fork carriage 19 carrying a pair of forks 21, 23. The upright mast 17 is a multi-stage mast so that the forks 21, 23 are height adjustable up and down the mast and there is further provided a pantograph arrangement 20 to alter the reach of the forks. As an alternative to a pantograph arrangement, extensible forks could be provided. Indeed, the mast may also be mounted on a mast carriage slidable forwards and backwards along the U-shaped chassis.

There is further provided a pair of front wheels 25, 27, one at the forwardmost end of each of the side bars 5, 7, and a steerable rear wheel 29 located substantially centrally along the rear cross bar 9. Referring specifically to FIG. 2, it can be seen that when the forks 21, 23 are retracted and lowered as shown, they are in a position capable of picking up a load (not shown) where the majority of the weight of the load will be rearward of the front wheels.

Referring specifically to FIG. 1, it can be seen that the internal distance, $D_i$, between the side bars will restrict the size of loads that may be picked up or placed down rearward of the front wheels. It is important therefore that the internal distance, $D_i$, is not too narrow. Furthermore, the outer distance, $D_o$, from the outside surface of one front wheel 25 to the outer surface of the other front wheel 27 is illustrated. As mentioned above, it is important that the outer distance, $D_o$, does not exceed the width of the carrying vehicle (not shown).

Figure 9:
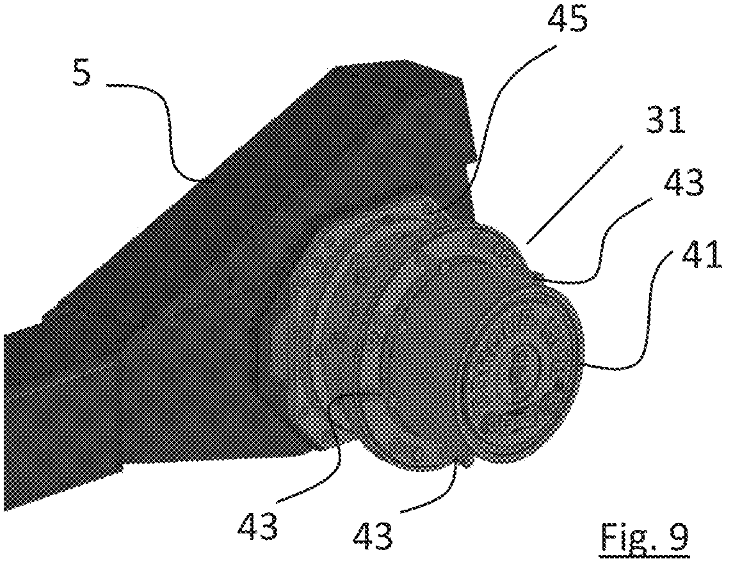
FIG. 9 is a view of a side bar with the electric wheel motor assembly mounted thereon.
Figure 10:
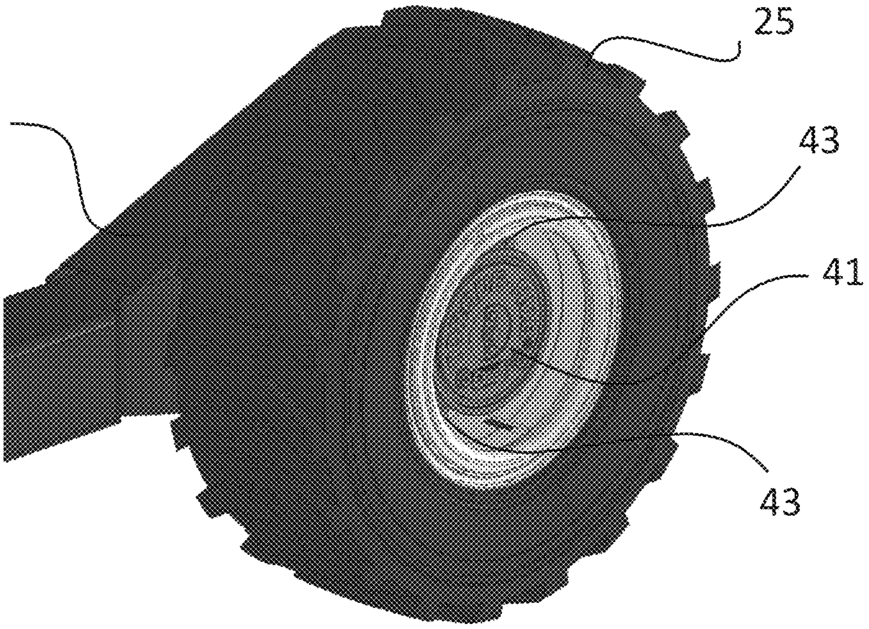
FIG. 10 is view similar to FIG. 9 with a wheel mounted on the electric wheel motor assembly.
Figure 11:
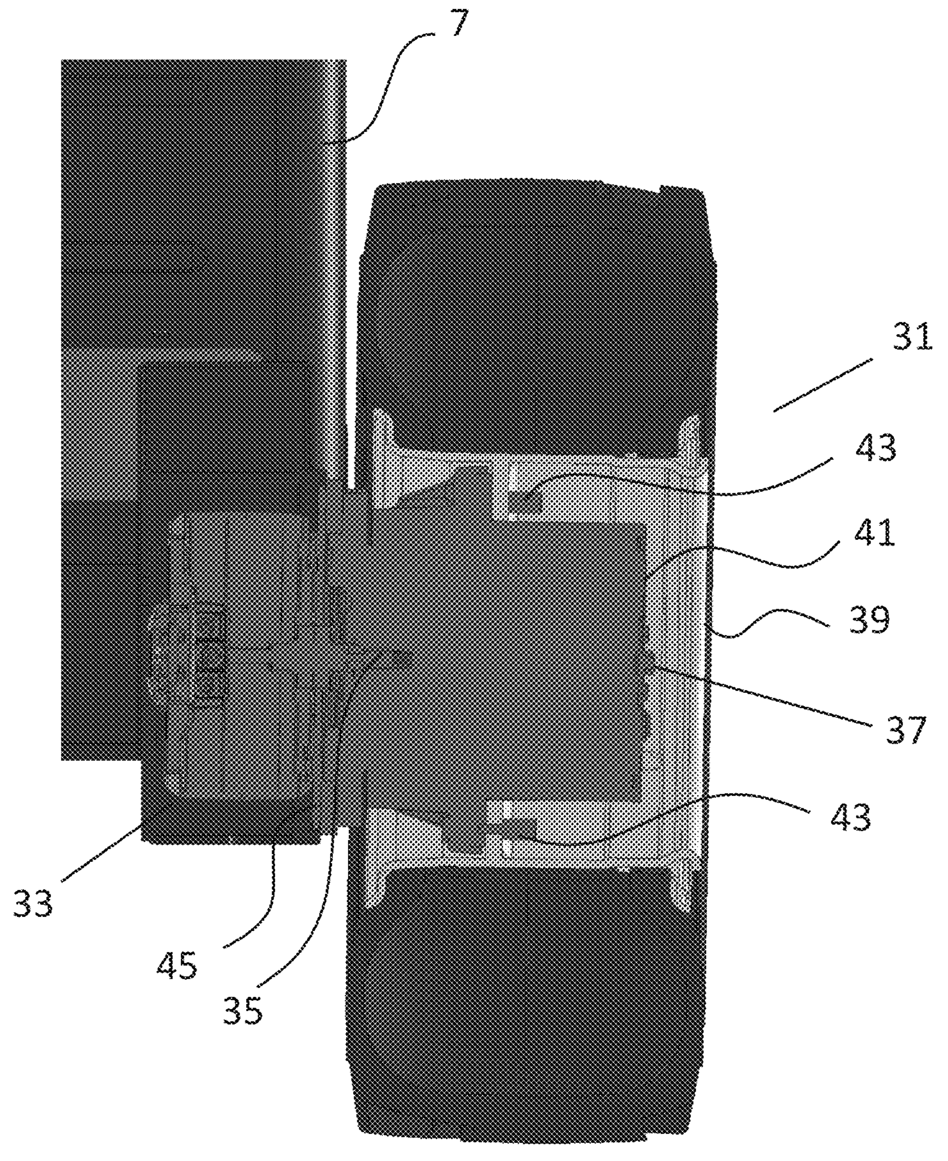
FIG. 11 is a view of the sidebar, the wheel and the electric wheel motor assembly shown in partial outline.
Figure 12:
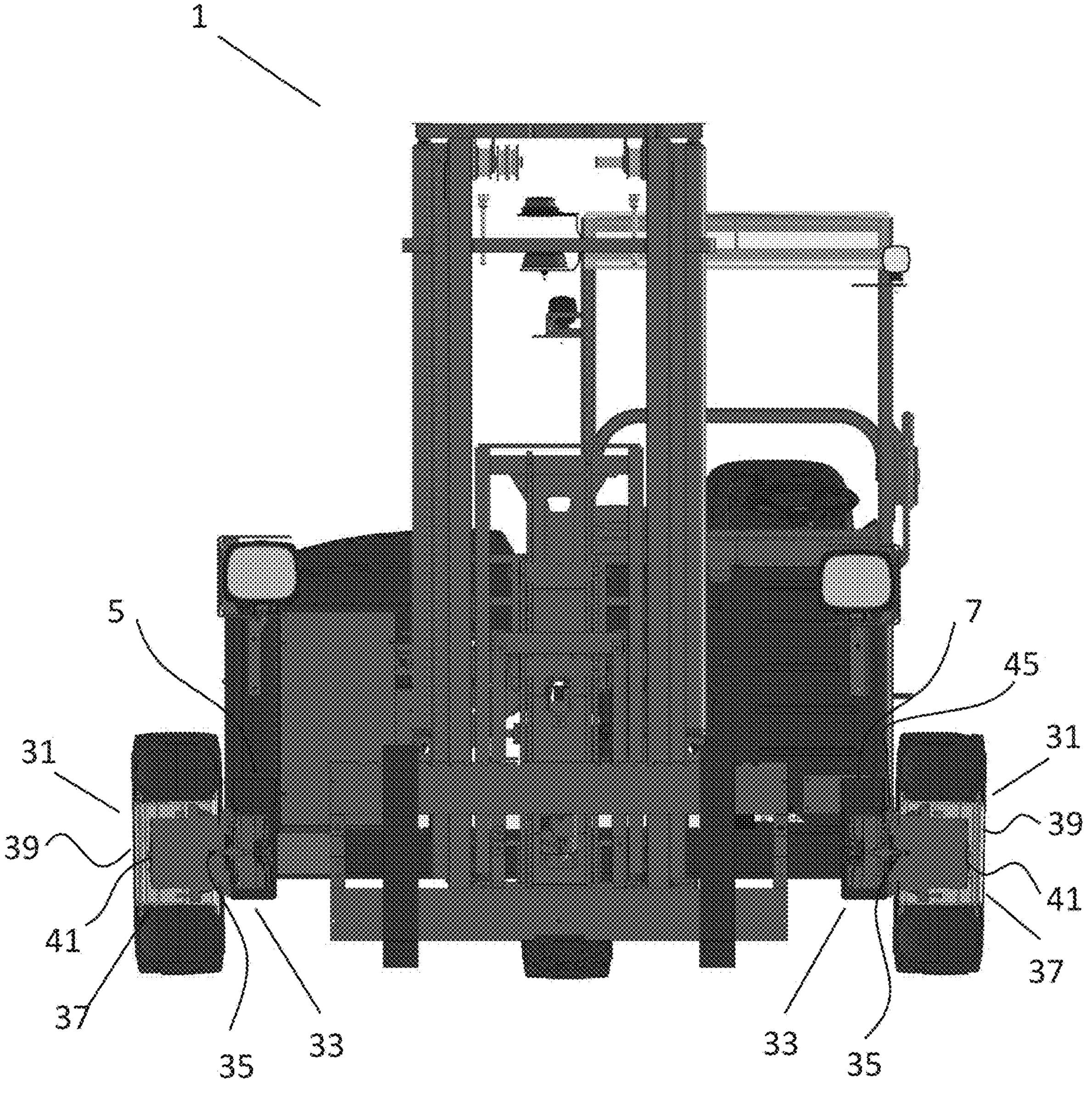
FIG. 12 is a front view of a truck mounted forklift according to the invention shown in partial outline.

Referring now to FIGS. 3 to 12 inclusive, there is shown various advantageous aspects of the TMFL 1 according to the invention. Referring first of all to FIGS. 11 and 12, there is shown views of a dedicated electric wheel motor assembly 31 for each of the front wheels 25, 27 incorporated into the forklift 1. Each of the electric wheel motor assemblies 31 comprises an interior permanent magnet (IPM) motor 33 having a drive shaft 35, and a planetary gear box 37 coupled to the IPM motor 33. The planetary gear box 37 is mounted axially in-line with and driven by the drive shaft 35 of the IPM AC motor 33. Importantly, the IPM motor 33 is mounted substantially internal the respective side bar 5, 7 and the planetary gear box is mounted substantially internal the bounds of the wheel rim 39.

The planetary gear box is encased in a hub casing 41, and the hub casing has a plurality of coupling members 43, in this case provided by threaded bolts, arranged circumferentially around its surface for engagement of the wheel rim 39. There is further provided a mounting plate 45 located substantially intermediate the IPM motor 33 and the planetary gear box 37 for securing the electric wheel motor assembly 31 to the side bar 5, 7. It can be seen that the particular construction is compact with the IPM motor being mounted in the side bar 5, 7 and the planetary gear box 37 being mounted inside the confines of the wheel rim 39. In this way, the internal distance, $D_i$, is not reduced substantially and the outer distance, $D_o$, is not substantially widened. Furthermore, by having the IPM motor and the planetary gear box axially aligned in this manner, the power transfer from the electric motor to the gearing will be efficient, reducing power consumption and increasing battery life.

Referring specifically to FIGS. 3 to 6, there is shown representations of the electric wheel motor assembly 31 and components thereof in more detail, free of the TMFL. The electric wheel motor assembly 31 comprises a IPM AC motor 33, a planetary gear box 37 and a mounting plate 45. The planetary gear box 37 is shown in more detail in FIG. 5 where parts of the wheel hub 41 have been shown in ghost outline. The planetary gear box comprises a 47:1 gearing ratio to reduce the speed and increase the torque output of the motor.

Figure 7:
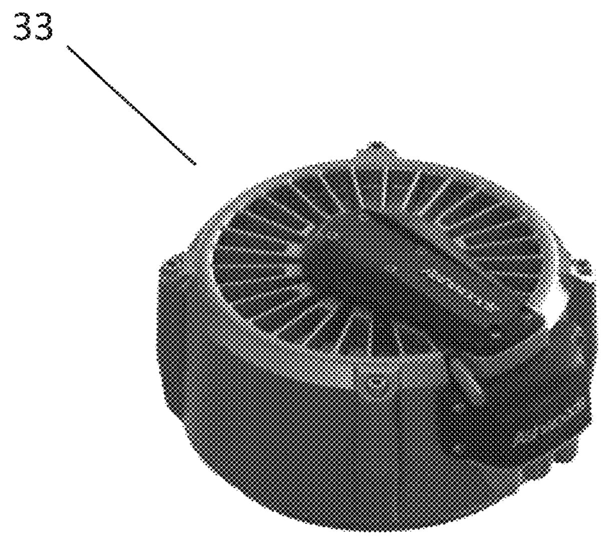
FIG. 7 is a perspective view of the IPM motor component of the electric wheel motor assembly.
Figure 8:
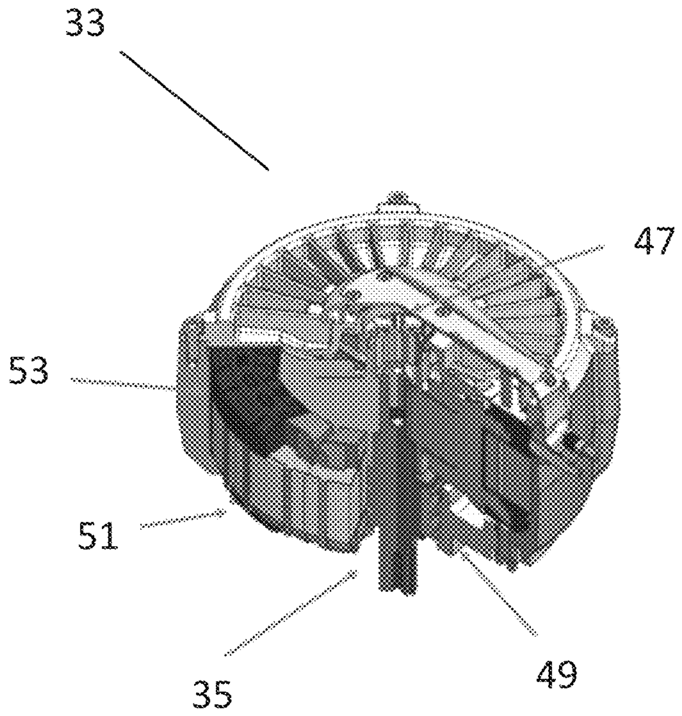
FIG. 8 is a view similar to FIG. 7 shown in partial cross-section.

Referring specifically to FIGS. 7 and 8, there is shown representations of the IPM AC motor 33. Referring specifically to FIG. 8, where the IPM AC motor is shown in partial cross section, the various components of the motor can be seen including the drive shaft 35, an encoder 47, a cantilevered rotor design 49, an overmoulding 51 and an encapsulation 53 of the motor. The permanent magnets (not shown) are stored in slots formed in the rotor.

Referring specifically to FIG. 9, the electric wheel motor assembly 31 is shown mounted onto a side bar 5 of a TMFL according to the invention. The mounting plate 45 may be welded or bolted into position onto the side bar 5. The wheel hub casing 41 and the coupling members 43 are ready for engagement of a wheel. Referring to FIG. 10, the wheel 25 has been connected to the wheel hub casing 41 and coupling members 43.

Figure 13:
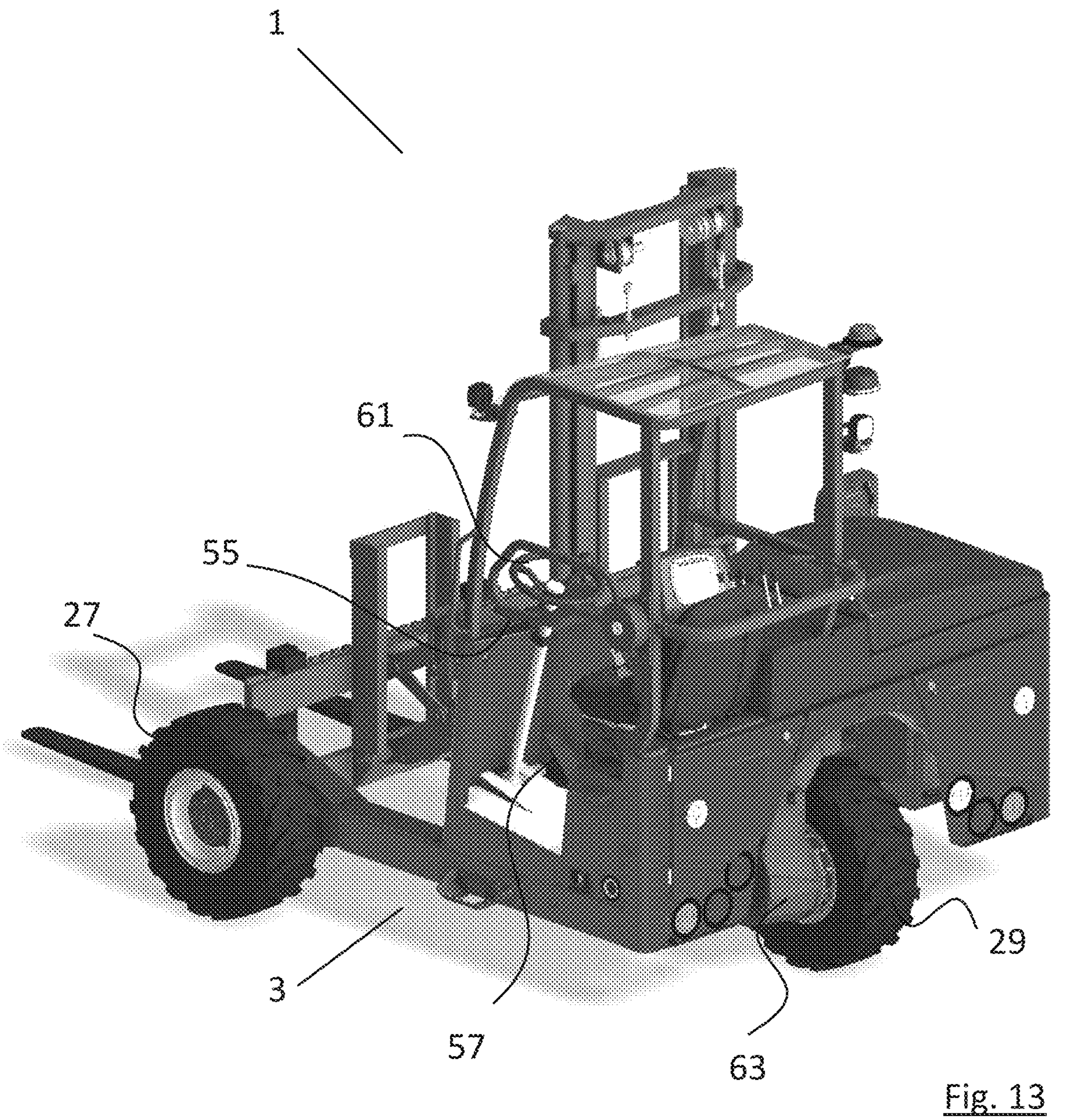
FIG. 13 is a rear perspective view of the TMFL according to the invention.
Figure 14:
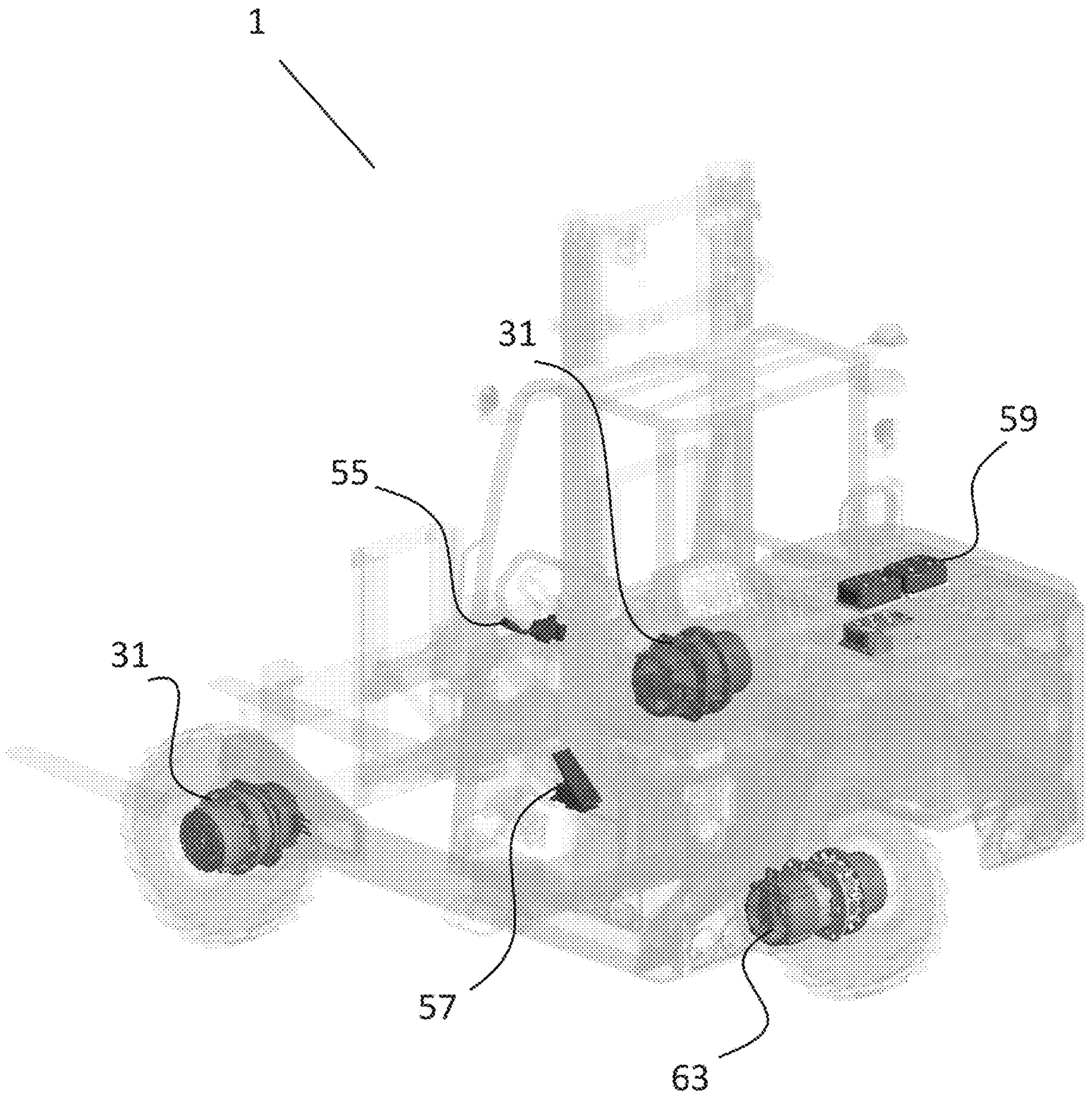
FIG. 14 is view similar to FIG. 13 with many of the components of the TMFL shown in ghost outline.
Figure 15:
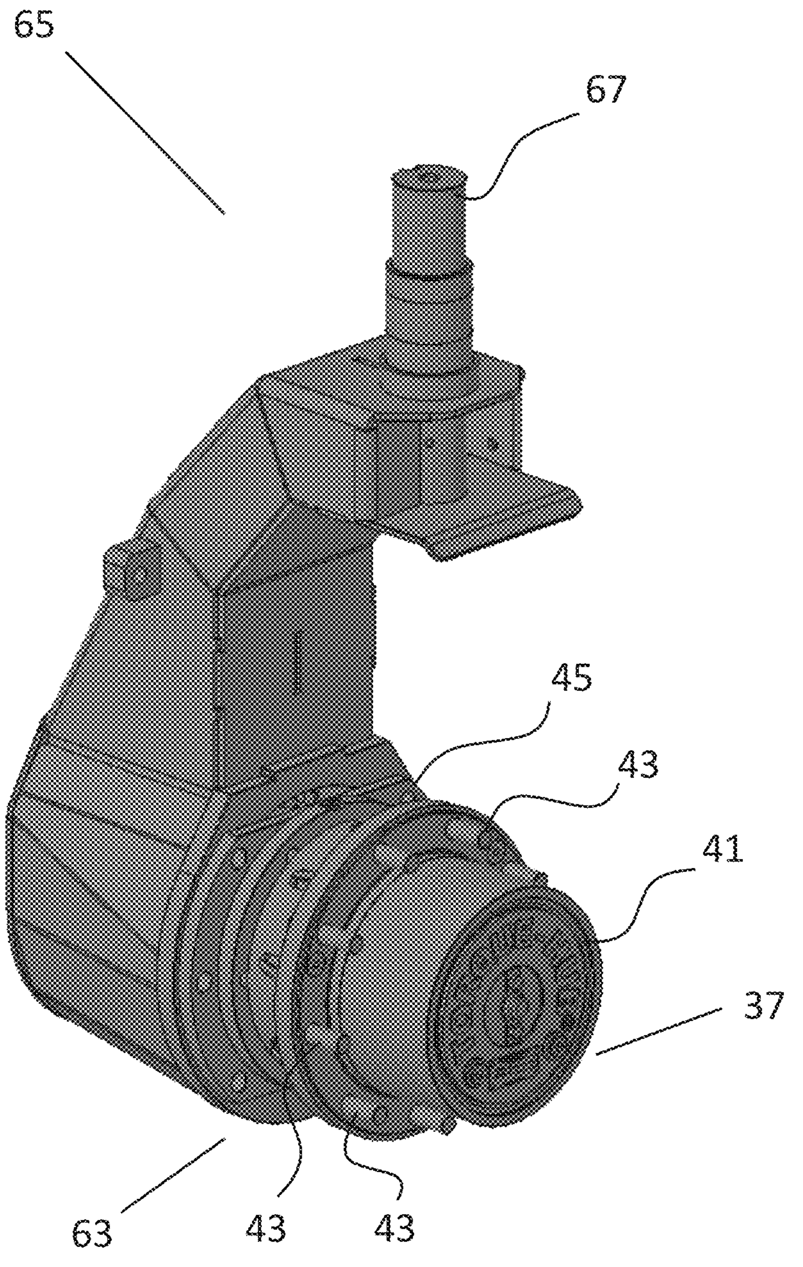
FIG. 15 is a perspective view of a rear wheel assembly incorporating the electric rear wheel motor assembly according to the invention.
Figure 16:
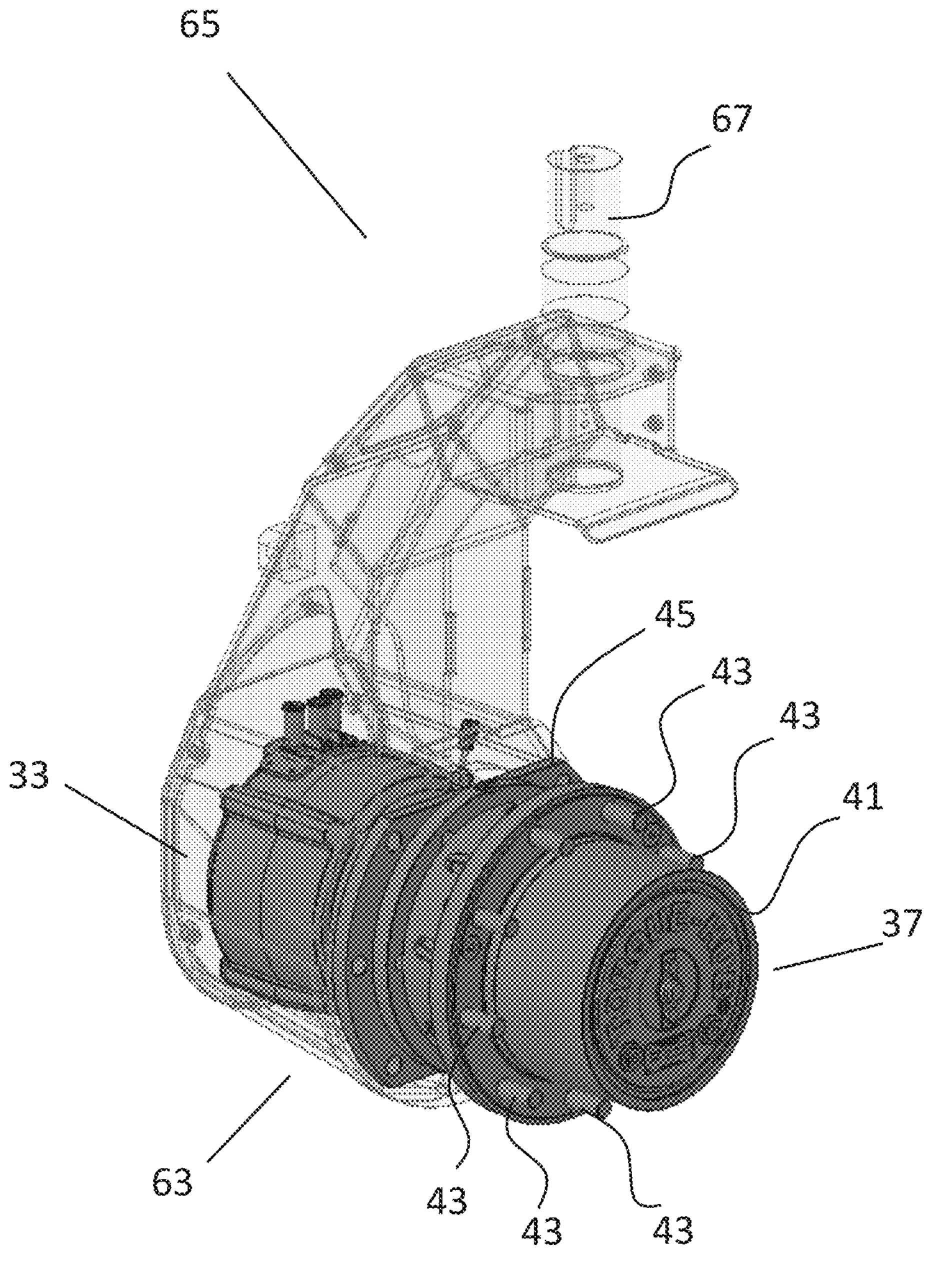
FIG. 16 is view similar to FIG. 15 with parts of the rear wheel assembly shown in ghost outline.
Figure 18:
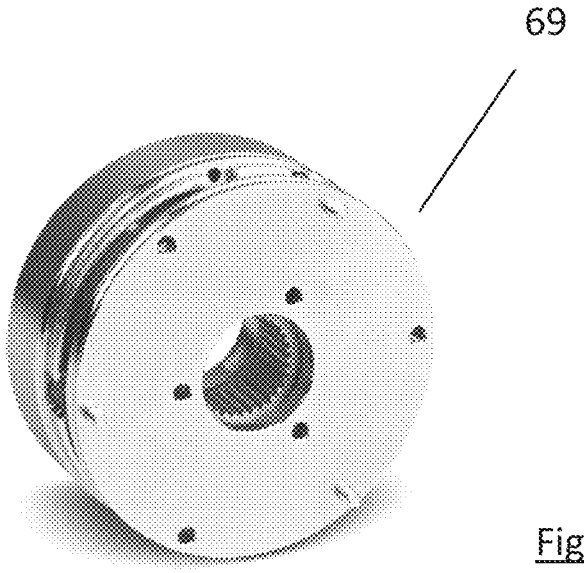
FIG. 18 is a perspective view of a brake assembly for the electric rear wheel motor assembly.
Figure 17:
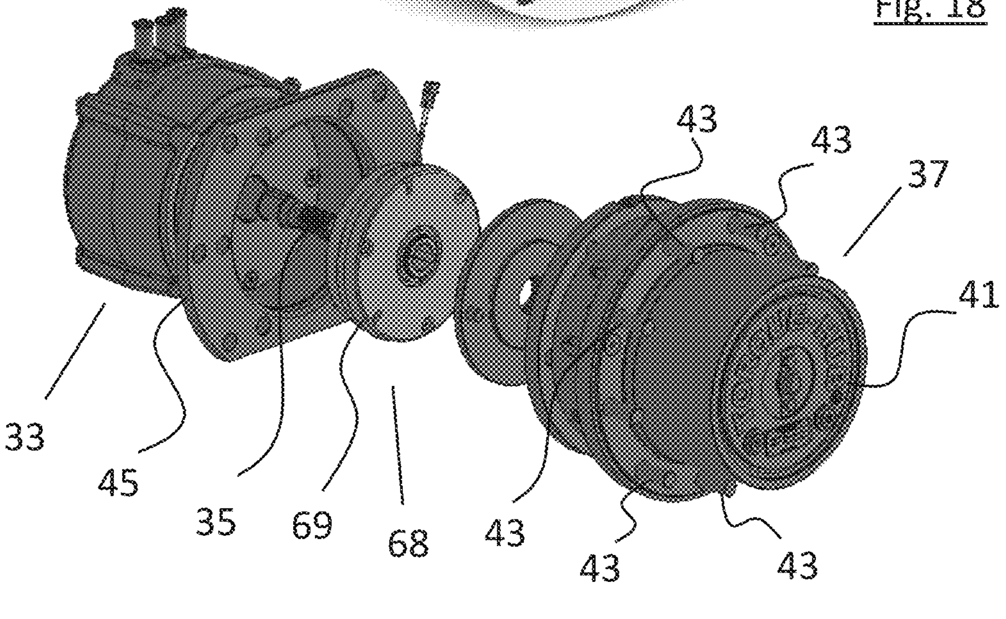
FIG. 17 is an exploded view of the electric rear wheel motor assembly.

Referring to FIGS. 13 and 14, there is shown various perspective views of the TMFL 1 according to the invention with (as shown in FIG. 14) some of the components of the drive system and their positions shown in detail. The drive system includes the pair of electric wheel motor assemblies 31, one for each of the front wheels 25, 27, a forward reverse lever 55, an accelerator pedal 57, a controller unit 59, a steering wheel 61 and an electric rear wheel motor assembly 63. The controller unit 59 preferably comprises a plurality of sub-units, one for each motor.

In use, control lines (not shown) are provided to relay control signals and sensor data to and/or from the forward reverse lever 55, the accelerator pedal 57, the steering wheel 61, the front wheel electric wheel motor assemblies 31 and the electric rear wheel motor assembly 63. Based on the control inputs and the sensor inputs, the controller unit 59 delivers appropriate operating signals and power from the battery 13 to each of the electric wheel motor assemblies 31 and the electric rear wheel motor assembly 63.

Preferably, steering of the forklift is controlled hydraulically, in which case the steering wheel itself would not typically be used to provide a control signal directly. Instead, a steering cylinder responsive to the steering wheel would be used to provide the control signal. However, it is possible to have steer by wire, in which case a steering wheel and encoder that supply a signal directly to the control system could be provided.

Referring to FIGS. 15 to 18 inclusive, there are shown views of the steered rear wheel's mounting column 65, including the electric rear wheel motor assembly 63, where like parts have been given the same reference numeral as before. The steered rear wheel's mounting column 65 is able to pivot about steering axle 67 and means (not shown) are provided to couple the input from the steering wheel 61 to the steered rear wheel's mounting column 65 and to cause the steered rear wheel's mounting column to rotate about steering axle 67. The steering axle 67 and means to pivot the mounting column 65 about the steering axle are standard features of a TMFL and will not be described in more detail here as it would be understood to the skilled addressee.

The difference between the implementation shown and the standard steered rear wheel mounting columns is that there is provided an electric rear wheel motor assembly 63, similar in construction to the electric wheel motor assembly 31 for each of the front wheels. The electric rear wheel motor assembly 63 differs from the electric wheel motor assembly 31 in that there is provided a braking assembly 68, more specifically a spring-applied electro-magnetic brake disc 69. The braking disc is positioned intermediate the motor 33 and the gear box 37. The braking disc is spring loaded and is released upon provision of an electrical current. In this way, if power is turned off or cut to the braking assembly, the braking disc will engage, thereby acting against and preventing rotation of the wheel. Preferably, the spring force of the spring-applied electro-magnetic brake disc is of the order of 60 Nm. Once power is restored to the braking assembly, the braking disc will be released. It is envisaged however that higher braking torques, up to the order of 100 Nm, may be required for heavier machines. This may also depend in part on the gearbox ratio.

It is envisaged that instead of providing an electro-magnetic brake disc 69 intermediate the motor 33 and the gear box 37, the braking disc could be positioned on the opposite side of the motor in a position where it can operate to prevent operation of the motor and rotation of the drive shaft.

Figure 19:
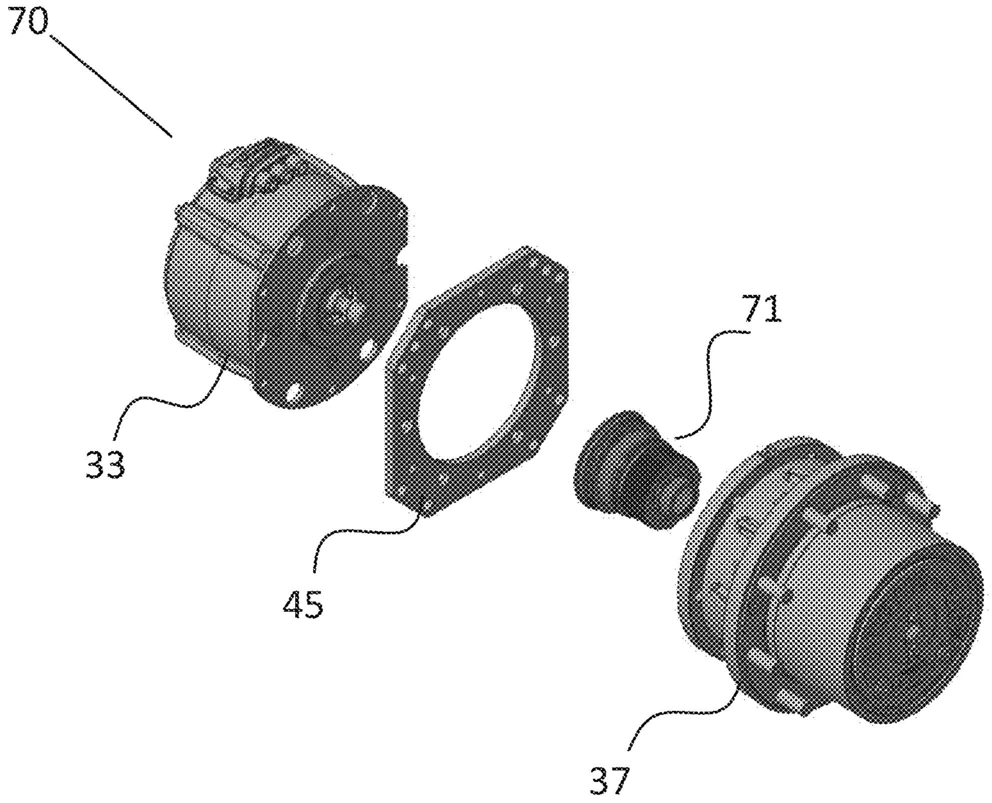
FIG. 19 is an exploded view of an alternative electric wheel motor assembly.

Referring now to FIG. 19, there is shown an alternative embodiment of electric wheel motor assembly, indicated generally by the reference numeral 70, where like parts have been given the same reference numeral as before. The electric wheel motor assembly 70 is similar to the electric rear wheel motor assembly 63 shown in FIG. 17 with the exception that instead of an electro-magnetic brake disc, there is provided a hydraulic brake component 71. The hydraulic brake component 71 works in a similar manner to the electromagnetic brake in that the brake is spring applied. However, instead of supplying an electric current to deactivate the brake, the brake is released by application of hydraulic pressure.

In addition to fitting a brake in the rear wheel assembly, it is envisaged that a braking mechanism could be provided in one or both front wheels, as well as or instead of the braking mechanism in the rear wheel. There is the option for fitting a brake in the front motors only, or in all three motors. Although it is more difficult to fit the brakes in the front motors, if a single brake is not sufficient then it may be necessary to provide two, or indeed three brakes.

In the embodiments shown, the electric rear wheel motor assembly 63 is provided with a 20 kW motor and the electric front wheel motor assembly 31 is provided with a 10 kW motor. In the embodiment shown, the lifting assembly comprises a fixed upright mast. However, it will be understood that other configurations of lifting assembly would also be applicable including, for example, an upright mast mounted on a carriage that is in turn slidably mounted on the side bars, slidable forwards and backwards on the side bars, or indeed a telescopic boom arrangement.

In the embodiment shown, the front wheels are located entirely on the outside of the side bar. In other words, the front wheels are located to one side of the side bar remote from the main longitudinal axis of the TMFL. The IPM motor is located inside the side bar.

In this specification the terms "comprise, comprises, comprised and comprising" and the terms "include, includes, included and including" are all deemed totally interchangeable and should be afforded the widest possible interpretation.

The invention is not limited solely to the embodiments hereinbefore described but may be varied in both construction and detail within the scope of the appended claims.

The invention claimed is:

1. A truck mounted forklift (TMFL) comprising a U-shaped chassis having a pair of forwardly projecting side bars bridged by a rear cross bar, a pair of front wheels, one at the forwardmost end of each of the side bars, and a rear wheel located substantially centrally on the rear cross bar, a lifting assembly mounted on the U-shaped chassis comprising a fork carriage and a pair of forks mounted on the fork carriage, the lifting assembly being configured to provide adjustment to the height and the reach of the forks, a driver's station mounted on the chassis and a battery pack mounted on the chassis, and in which each of the front wheels is provided with a dedicated electric wheel motor assembly, each of the electric wheel motor assemblies comprising an interior permanent magnet (IPM) motor having a drive shaft, a planetary gear box coupled to the IPM motor, the planetary gear box being mounted axially in-line with and driven by the drive shaft, in which the IPM motor is mounted substantially internal the side bar and the planetary gear box is mounted substantially internal the bounds of a wheel rim of the front wheel.

2. The truck mounted forklift as claimed in claim 1 in which the planetary gear box is encased in a wheel hub casing, the wheel hub casing having a plurality of coupling members for engagement of a wheel.

3. The truck mounted forklift as claimed in claim 2 in which the coupling members comprise a plurality of bolts circumferentially spaced around the hub casing.

4. The truck mounted forklift as claimed in claim 1 in which there is provided a mounting plate for securing the electric wheel motor assembly to the side bar.

5. The truck mounted forklift as claimed in claim 4 in which the mounting plate is located intermediate the IPM motor and the planetary gear box.

6. The truck mounted forklift as claimed in claim 1 in which the IPM motor of the electric wheel motor assembly is a 10 kW motor.

7. The truck mounted forklift as claimed in claim 1 in which the rear wheel is provided with a dedicated electric rear wheel motor assembly, the electric rear wheel motor assembly comprising an interior permanent magnet (IPM) motor having a drive shaft, a planetary gear box coupled to the IPM motor, the planetary gear box being mounted axially in-line with and driven by the drive shaft, in which the planetary gear box is mounted substantially internal the bounds of the wheel rim of the rear wheel.

8. The truck mounted forklift as claimed in claim 7 in which electric rear wheel motor assembly comprises a brake assembly intermediate the IPM motor and the planetary gear box.

9. The truck mounted forklift as claimed in claim 8 in which the brake assembly is a spring-applied electro-magnetic brake disc that has a default locked configuration and is transitioned from a locked configuration to a release configuration by application of an electrical current.

10. The truck mounted forklift as claimed in claim 9 in which the spring force of the spring-applied electro-magnetic brake disc is greater than or equal to 60 Nm.

11. The truck mounted forklift as claimed in claim 7 in which the IPM motor of the electric rear wheel motor assembly is a 20 kW motor.

12. The truck mounted forklift as claimed in claim 1 in which the planetary gear box is of the order of a 47:1 planetary gear box operable to reduce the speed and increase the torque output of the motor.

13. The truck mounted forklift as claimed in claim 1 in which the battery pack mounted on the chassis drives each of the IPM motors.

14. The truck mounted forklift as claimed in claim 2 in which there is provided a mounting plate for securing the electric wheel motor assembly to the side bar.

15. The truck mounted forklift as claimed in claim 14 in which the mounting plate is located intermediate the IPM motor and the planetary gear box.

16. The truck mounted forklift as claimed in claim 2 in which the rear wheel is provided with a dedicated electric rear wheel motor assembly, the electric rear wheel motor assembly comprising an interior permanent magnet (IPM) motor having a drive shaft, a planetary gear box coupled to the IPM motor, the planetary gear box being mounted axially in-line with and driven by the drive shaft, in which the planetary gear box is mounted substantially internal the bounds of the wheel rim of the rear wheel.

17. The truck mounted forklift as claimed in claim 16 in which electric rear wheel motor assembly comprises a brake assembly intermediate the IPM motor and the planetary gear box.

18. The truck mounted forklift as claimed in claim 17 in which the brake assembly is a spring-applied electro-magnetic brake disc that has a default locked configuration and is transitioned from a locked configuration to a release configuration by application of an electrical current.

19. The truck mounted forklift as claimed in claim 18 in which the spring force of the spring-applied electro-magnetic brake disc is greater than or equal to 60 Nm.

20. The truck mounted forklift as claimed in claim 16 in which the IPM motor of the electric rear wheel motor assembly is a 20 kW motor.

* * * * *